US012571963B2

(12) United States Patent
Jung et al.

(10) Patent No.: US 12,571,963 B2
(45) Date of Patent: Mar. 10, 2026

(54) POLARIZATION BEAM SPLITTER ROTATOR

(71) Applicant: Taiwan Semiconductor Manufacturing Company, Ltd., Hsinchu (TW)

(72) Inventors: Ming Yang Jung, Kaohsiung (TW); Lan-Chou Cho, Hsinchu (TW); Stefan Rusu, Sunnydale, CA (US); Cheng-Tse Tang, Hsinchu County (TW); Tai-Chun Huang, New Taipei (TW); You-Cheng Lu, Tainan (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 435 days.

(21) Appl. No.: 18/317,714

(22) Filed: May 15, 2023

(65) Prior Publication Data

US 2024/0385376 A1     Nov. 21, 2024

(51) Int. Cl.
*G02B 6/126* (2006.01)
*G02B 6/13* (2006.01)

(52) U.S. Cl.
CPC .............. *G02B 6/126* (2013.01); *G02B 6/13* (2013.01)

(58) Field of Classification Search
CPC .................................................... G02B 6/126
See application file for complete search history.

(56) References Cited

U.S. PATENT DOCUMENTS 9,547,129 B1 *   1/2017   Kato ..................... G02B 6/1228
2019/0033520 A1 *   1/2019   Lin ....................... G02B 6/1228
(Continued)

FOREIGN PATENT DOCUMENTS

CN     105866885 A     8/2016
CN     113167971 A     7/2021
(Continued)

OTHER PUBLICATIONS

Abdullah S. Kara et al., Recent Advances in Coherent Optical Communications for Short-Reach: Phase Retrieval Methods, Photonics 2023, 10, 308. https://doi.org/10.3390/photonics10030308, Mar. 13, 2023, 15 pages.
(Continued)

*Primary Examiner* — Chris H Chu
(74) *Attorney, Agent, or Firm* — HAYNES AND BOONE, LLP

(57)     ABSTRACT

Optical devices, polarization rotators, and mode converters are provided. An optical device of the present disclosure includes a polarization rotator and a mode converter. The polarization rotator includes a straight waveguide segment having a first end and a second end, a first widening waveguide segment continuing from the second end, a first tapering waveguide segment continuing from the first widening waveguide segment, a second widening waveguide segment disposed over the first widening waveguide segment, and a second tapering waveguide segment continuing from the second widening waveguide segment. The mode converter includes a third tapering waveguide segment continuing from the second tapering waveguide segment, and a third widening waveguide segment disposed over the third tapering waveguide segment. An output end of the polarization rotator is coupled to an input end of the mode converter.

20 Claims, 13 Drawing Sheets

(56) References Cited

U.S. PATENT DOCUMENTS

| | | | | |
|---|---|---|---|---|
| 2020/0096700 A1 * | 3/2020 | Park | .................. | G02B 6/12007 |
| 2021/0382233 A1 * | 12/2021 | Baba | ..................... | G02B 6/126 |

FOREIGN PATENT DOCUMENTS

| | | | | | |
|---|---|---|---|---|---|
| CN | 116413857 A | * | 7/2023 | ............ | G02B 6/126 |
| TW | 201235721 A | | 9/2012 | | |

OTHER PUBLICATIONS

Po Dong, Silicon Photonic Integrated Circuits for Wavelength-Division Multiplexing Applications, IEEE Journal of Selected Topics in Quantum Electronics, vol. 22, No. 6, Nov./Dec. 2016, 9 pages.

* cited by examiner

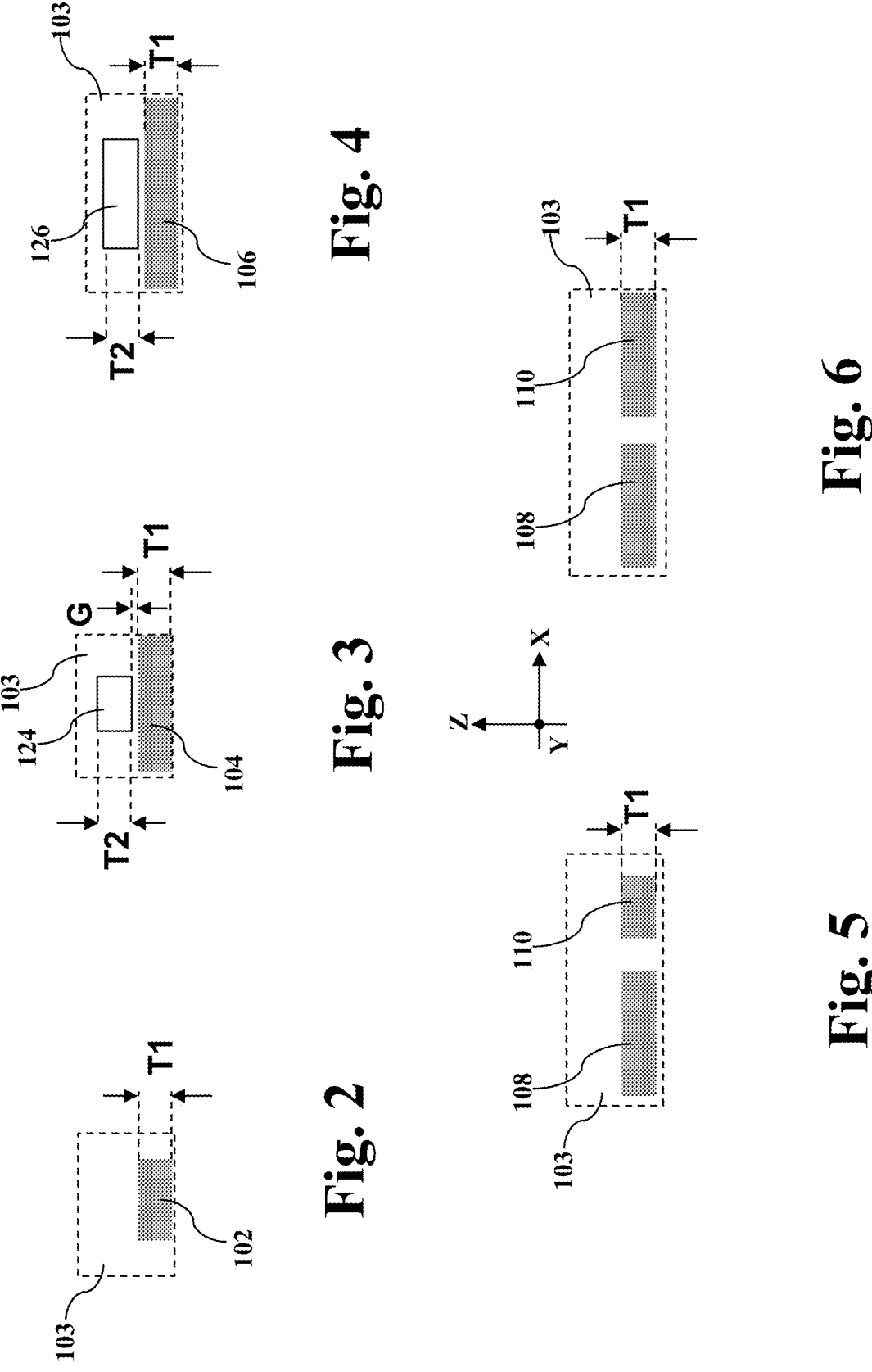

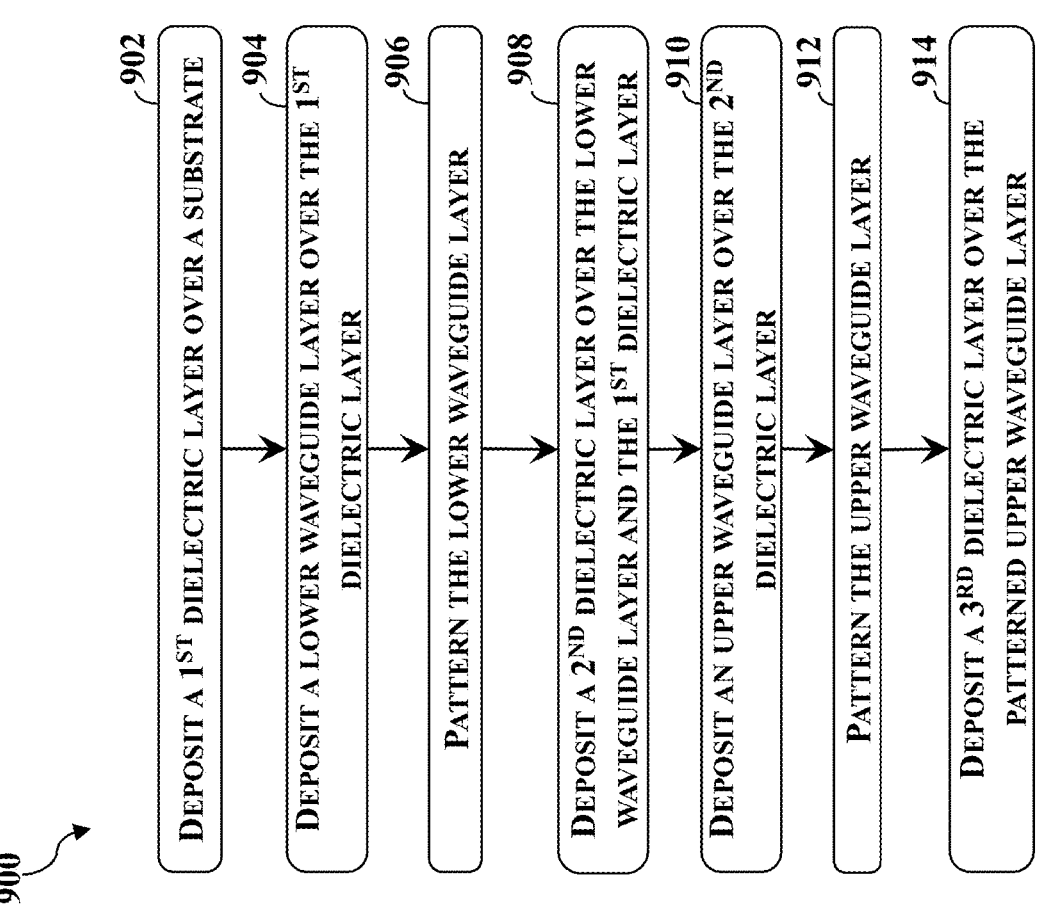

900

902 DEPOSIT A 1ST DIELECTRIC LAYER OVER A SUBSTRATE

904 DEPOSIT A LOWER WAVEGUIDE LAYER OVER THE 1ST DIELECTRIC LAYER

906 PATTERN THE LOWER WAVEGUIDE LAYER

908 DEPOSIT A 2ND DIELECTRIC LAYER OVER THE LOWER WAVEGUIDE LAYER AND THE 1ST DIELECTRIC LAYER

910 DEPOSIT AN UPPER WAVEGUIDE LAYER OVER THE 2ND DIELECTRIC LAYER

912 PATTERN THE UPPER WAVEGUIDE LAYER

914 DEPOSIT A 3RD DIELECTRIC LAYER OVER THE PATTERNED UPPER WAVEGUIDE LAYER

Fig. 19

POLARIZATION BEAM SPLITTER ROTATOR

BACKGROUND

Modern-day information networks rely heavily optical fiber communication. Electrical signal is converted to optical signal to be transmitted via fiber networks and optical signal received is converted back to electrical signal for processing. While optical signal travelling on optical fibers and waveguides may have transverse electrical (TE) and transverse magnetic (TM) polarization modes, photonic components are usually designed to work with a specific polarization mode. That means, when different polarization modes are present, two sets of photonic components may be needed to operate on different polarization modes. Polarization beam splitter rotators (PBSR) have been developed to convert optical signal of more than one polarization mode to optical signal with one polarization mode. With the help of the conversion, a simpler and more efficient photonic component design is possible. While existing PBSRs are generally adequate for their intended purposes, they are not satisfactory in all aspects. For example, existing PBSRs may be sensitive to temperature changes and the conversion efficiency may not be ideal.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIGS. 2-6 illustrate various cross-sectional view along a length of a polarization rotator of the PBSR in FIG. 1, according to one or more aspects of the present disclosure.

FIG. 19 illustrates a flowchart of a method 900 for forming the PBSRs and polarization rotator of the present disclosure, according to one or more aspects of the present disclosure.

DETAILED DESCRIPTION

Figure 1:
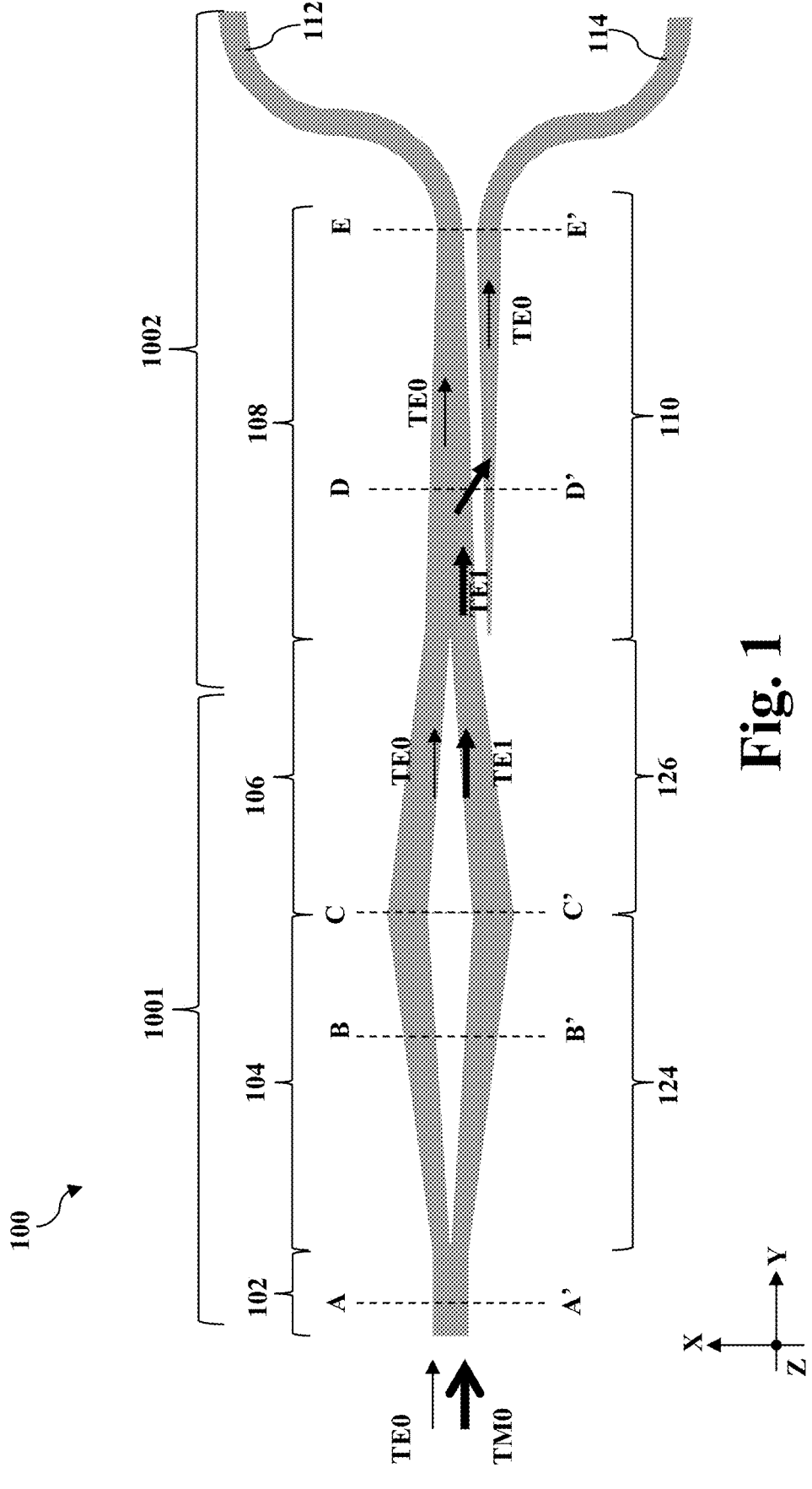
FIG. 1 illustrates a polarization beam splitter rotator (PBSR) according to a first embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Further, when a number or a range of numbers is described with "about," "approximate," and the like, the term is intended to encompass numbers that are within a reasonable range considering variations that inherently arise during manufacturing as understood by one of ordinary skill in the art. For example, the number or range of numbers encompasses a reasonable range including the number described, such as within +/−10% of the number described, based on known manufacturing tolerances associated with manufacturing a feature having a characteristic associated with the number. For example, a material layer having a thickness of "about 5 nm" can encompass a dimension range from 4.25 nm to 5.75 nm where manufacturing tolerances associated with depositing the material layer are known to be +/−15% by one of ordinary skill in the art.

Silicon-on-insulator (SOI) construction is a popular choice for a photonic integrated circuit (PIC) due to the high refractive index contrast between silicon and silicon oxide. An optical fiber may be coupled to an optical waveguide on a PIC using edge coupling or a grating coupling. While silicon is a great waveguide material and can be doped to be controlled electrically, it has a thermal-optic coefficient that makes it sensitive to temperature change. To combat the temperature sensitivity issues, silicon optical wave guide devices may require thermal tuning by use of a thermal heater or a feedback control mechanism. Silicon nitride may also be used as a waveguide as it also has high refractive index contrast with silicon oxide. Silicon nitride is less sensitive to temperature but cannot be doped. Both silicon and silicon nitride have strong birefringence. Optical signal travelling on waveguides may have transverse electrical (TE) and transverse magnetic (TM) polarization modes. In the TE mode, the electric field vector is transverse and perpendicular to the waveguide axis. In the TM mode, the magnetic field is transverse and perpendicular to the waveguide axis.

TE mode and the TM mode give the optical signal very different effective refractive indices. Because the effective refractive indices are important design parameters, silicon photonics components usually are designed to work with a specific polarization. This creates complication in design of the PICs. For example, a polarization beam splitter (PBS) may be used to split the optical signal into TE mode signal and TM mode signal, which are separately processed by a mode-specific component, such as a demultiplexer (De-Mux). Alternatively, the TM signal may be converted to TE signal so only TE-specific demultiplexers are needed. Functions of the polarization rotation and the mode conversion may be performed by a polarization beam splitter rotator (PBSR).

The present disclosure provides various construction of PBSRs. A PBSR of the present disclosure may be divided into a polarization rotator that rotates signal in the TM mode to the TE mode and a mode converter that converts signal of a higher order TE mode (such as TE1) to a TE fundamental mode (i.e., TE0). The polarization rotator of the present disclosure includes a lower waveguide layer and an upper waveguide layer. Each of the lower waveguide layer and the upper waveguide layer has at least inverse-taper segment and a tapering segment. A vertical projection area of the upper waveguide layer falls completely in a vertical projection area of the lower waveguide layer. In some embodiments, the at least one inverse-taper segment of the upper waveguide layer or the lower waveguide layer may include several stages of inverse tapering to reduce signal loss. The present disclosure also discloses novel structures of a mode converter that also includes a lower waveguide layer and an upper waveguide disposed over the lower waveguide layer.

FIG. 1 illustrates a polarization beam splitter rotator (PBSR) 100 according to a first embodiment of the present disclosure. The PBSR 100 includes a polarization rotator 1001 followed by a first mode converter 1002. That is, an output of the polarization rotator 1001 is coupled to an input of the first mode converter 1002. The polarization rotator 1001 has a lower waveguide layer and an upper waveguide layer disposed directly over the lower waveguide layer. The lower waveguide layer include a first lower segment 102, a second lower segment 104 and a third lower segment 106. The first lower segment 102 is a straight segment that extends lengthwise along the Y direction and has a uniform width along the X direction. The second lower segment 104 is continuous with the first lower segment 102 and is characterized by an inverse taper. The second lower segment 104 extends lengthwise along the Y direction and its width along the X direction increases linearly away from the first lower segment 102. It is noted that both sides of the second lower segment 104 have the same inverse tapering angles. The third lower segment 106 is continuous with the second lower segment 104 and is characterized by a taper. As shown in FIG. 1, the third lower segment 106 extends lengthwise along the Y direction and its width along the X direction decreases linearly away from the second lower segment 104.

The upper waveguide layer of the first polarization rotator 1001 is disposed directly over the lower waveguide layer and its vertical projection area falls completely within a vertical projection area of the lower waveguide layer. The upper waveguide layer includes a first upper segment 124 and a second upper segment 126. The first upper segment 124 is disposed directly over the second lower segment 104.

The second upper segment 126 is disposed directly over the third lower segment 106. The first upper segment 124 is characterized by an inverse taper. The first upper segment 124 extends lengthwise along the Y direction and its width along the X direction increases linearly away from the first lower segment 102. It is noted that both sides of the first upper segment 124 have the same inverse tapering angles. The second upper segment 126 is continuous with the first upper segment 124 and is characterized by a taper. As shown in FIG. 1, the second upper segment 126 extends lengthwise along the Y direction and its width along the X direction decreases linearly away from the first upper segment 124. The shapes (i.e., inverse taper) of the second lower segment 104 and the first upper segment 124 are configured to rotate a signal having a TE mode and a TM mode to a TE0-TM0 hybrid mode. The shapes (i.e., taper) of the third lower segment 106 and the second upper segment 126 are configured to convert the TM1 mode into a TE1 mode.

The first mode converter 1002 includes a fourth lower segment 108 and a fifth lower segment 110. The fourth lower segment 108 extends lengthwise along the Y direction and is characterized by a taper away from the polarization rotator 1001. The fourth lower segment 108 includes a width along the X direction that decreases linearly away from the polarization rotator 1001. The fifth lower segment 110 extends lengthwise along the Y direction and is characterized by an inverse taper along the Y direction. The fifth lower segment 110 includes a width along the X direction that increases away from the polarization rotator 1001. The fourth lower segment 108 and the fifth lower segment 110 are also disposed in the lower waveguide layer, along with the first lower segment 102, the second lower segment 104 and the third lower segment 106. The first mode converter 1002 includes a bar port 112 continuous with the fourth lower segment 108 and a cross port 114 continuous with the fifth lower segment 110. The fifth lower segment 110 functions to convert the TE1 mode to signal of TE0 mode. As a result, both the bar port 112 and the cross port 114 output signal of the TE0 mode.

Both the lower waveguide layer and the upper waveguide layer are disposed in a dielectric layer. Fragmentary cross-sectional views along lines A-A', B-B', C-C', D-D', and E-E' in FIG. 1 are shown in FIGS. 2-6, respectively. FIG. 2 illustrates a fragmentary cross-sectional view of the first lower segment 102 along line A-A' in FIG. 1. The first lower segment 102 is disposed in a dielectric layer 103, which may include silicon oxide. Along the Z direction, the first lower segment 102 has a first thickness T1. FIG. 3 illustrates a fragmentary cross-sectional view of the second lower segment 104 and the first upper segment 124 along line B-B' in FIG. 1. The second lower segment 104 and the first upper segment 124 are disposed in the dielectric layer 103 as well. Along the Z direction, the second lower segment 104 has the first thickness T1 and the first upper segment 124 has a second thickness T2. A bottom surface of the first upper segment 124 is spaced apart from a top surface of the second lower segment 104 by a portion of the dielectric layer 103 at a gap G. FIG. 4 illustrates a fragmentary cross-sectional view of the third lower segment 106 and the second upper segment 126 along line C-C' in FIG. 1. The third lower segment 106 and the second upper segment 126 are disposed in the dielectric layer 103 as well. Along the Z direction, the third lower segment 106 has the first thickness T1 and the second upper segment 126 has the second thickness T2. According to experimental results and computer simulations, when the lower waveguide layer includes silicon nitride (SiN) and the upper waveguide layer includes silicon (Si), the first thickness T1 should be less than 0.8 μm and the second thickness T2 should be less than 0.4 μm. The gap G should be less than 0.3 μm or the polarization rotator 1001 may not function properly.

FIGS. 5 and 6 illustrate fragmentary cross-sectional views of the fourth lower segment 108 and the fifth lower segment 110 along lines D-D' and E-E' in FIG. 1. Both the fourth lower segment 108 and the fifth lower segment 110 are disposed in the lower waveguide layer and are dispose in the dielectric layer 103. Both the fourth lower segment 108 and the fifth lower segment 110 include the first thickness T1. As shown in FIGS. 5-6, a width of the fifth lower segment 110 along the X direction is smaller than that of the fourth lower segment 108 closer to the third lower segment 106 but the difference between the two decreases away from the third lower segment 106.

Figure 7:
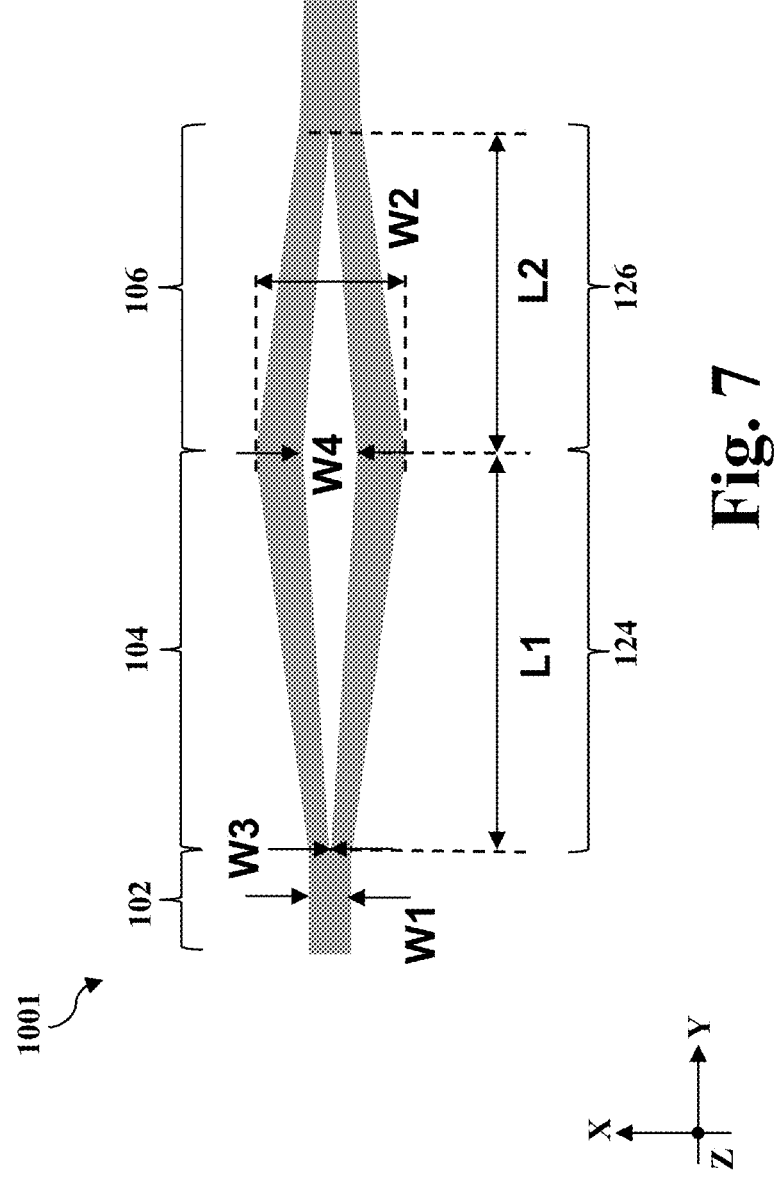
FIG. 7 illustrates an enlarged view of a polarization rotator of the PBSR in FIG. 1, according to one or more aspects of the present disclosure.

FIG. 7 includes an enlarged top view of the polarization rotator 1001 of the PBSR 100 in FIG. 1. FIG. 7 is intended to illustrate the width differences and variations among the different segments. The first lower segment 102 has a first width W1 along the X direction. The second lower segment 102 has a first length L1 along the Y direction. The width of the second lower segment 104 starts off at the first width W1 adjacent the first lower segment 102 and increases up to a second width W2 adjacent the third lower segment 106. The width of the first upper segment 124 starts off at the third width W3 adjacent the first lower segment 102 and increases up to a fourth width W4 adjacent the third lower segment 106. The third lower segment 106 and the second upper segment 126 include a second length L2 along the Y direction. According to experimental results and simulations, when the lower waveguide layer includes silicon nitride (SiN) and the upper waveguide layer includes silicon (Si), the first width W1 is about 1.25 to about 2 times of the first thickness T1, the second width W2 is about 1.1 to about 3 times of the fourth width W4, and the fourth width W4 is about 1.1 to 4 times of the second thickness T2. Additionally, when the lower waveguide layer includes silicon nitride (SiN) and the upper waveguide layer includes silicon (Si), the third width W3 should be less than 0.2 μm to reduce undesirable optical reflection. The first length L1 is greater than the second length L2. When the lower waveguide layer includes silicon nitride (SiN) and the upper waveguide layer includes silicon (Si), the first length L1 may be between about 200 μm and about 300 μm and the second length L2 may be between about 40 μm and about 60 μm.

In some of the examples described above, the lower waveguide layer (including the first lower segment 102, the second lower segment 104, the third lower segment 106, the fourth lower segment 108, and the fifth lower segment 110) includes silicon nitride (SiN) or consists essentially of silicon nitride and the upper waveguide layer (includes the first upper segment 124 and the second upper segment 126) includes silicon (Si) or consists essentially of silicon. In other embodiments, the lower waveguide layer and the upper waveguide layer may be formed of other materials. In one example, both the lower waveguide layer and the upper waveguide layer may include the same material, such as silicon (Si), silicon nitride (SiN), III-V semiconductor material (e.g., gallium nitride (GaN)), or polymers (e.g., polyimide (PI), polymethyl-methacrylate (PMMA), polystyrene (PS), or polycarbonate (PC)). In another example, the lower waveguide layer includes silicon (Si) and the upper waveguide layer includes silicon nitride (SiN). In yet another example, the lower waveguide layer may include III-V semiconductor and the upper waveguide layer includes polymers or vice versa.

It should be noted that while the PBSR 100 is described to have multiple lower segments and multiple upper segments, segments in the same level may be a continuous structure or patterned from a continuous structure. For example, the first lower segment 102, the second lower segment 104, the third lower segment 106, the fourth lower segment 108 may be a continuous structure, such as a continuous silicon nitride (SiN) structure. Nothing in the present disclosure requires or suggests that segments are necessarily formed separately or are discontinuous. The use of segment in the present disclosure is aimed to describe the structural features or width differences.

Figure 8:
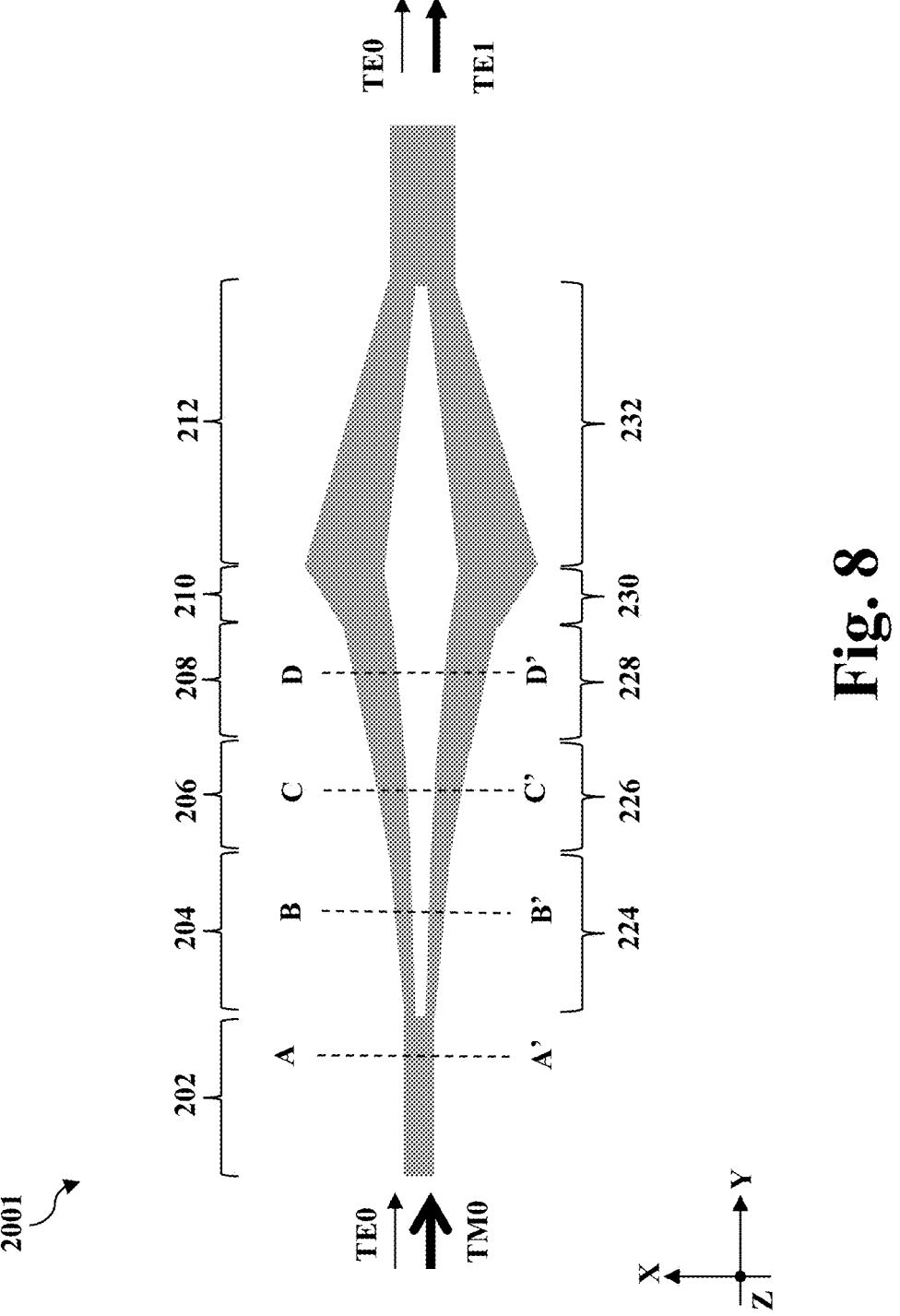
FIG. 8 illustrates a multi-stage polarization rotator, according to one or more aspects of the present disclosure.

FIG. 8 illustrates a multi-stage polarization rotator 2001. In some embodiments where the signal includes a spectrum of wavelengths, a single stage polarization rotator may suffer a loss because signal of wavelengths outside the range may not enter the hybrid mode (or hybridization mode) and its polarization will not be rotated. The multi-stage polarization rotator 2001 is aimed to reduce such loss due to a wider spectrum of signal wavelength. In the depicted embodiment, the multi-stage polarization rotator 2001 also includes a lower waveguide layer and an upper waveguide layer directly over the lower waveguide layer. The lower waveguide layer of the multi-stage polarization rotator 2001 includes a first lower segment 202, a second lower segment 204, a third lower segment 206, a fourth lower segment 208, a fifth lower segment 210, and a sixth lower segment 212. The upper waveguide layer of the multi-stage polarization rotator 2001 includes a first upper segment 224, a second upper segment 226, a third upper segment 228, a fourth upper segment 230, and a fifth upper segment 232. The first lower segment 202, the second lower segment 204, the third lower segment 206, the fourth lower segment 208, the fifth lower segment 210, and the sixth lower segment 212 are continuous. The first upper segment 224, the second upper segment 226, the third upper segment 228, the fourth upper segment 230, and the fifth upper segment 232 are continuous.

Reference is still made to FIG. 8. The first lower segment 202 is a straight segment that extends lengthwise along the Y direction and has a uniform width along the X direction. Each of the second lower segment 204, the third lower segment 206, the fourth lower segment 208, and the fifth lower segment 210 is characterized by an inverse taper. Each of the second lower segment 204, the third lower segment 206, the fourth lower segment 208, and the fifth lower segment 210 extends lengthwise along the Y direction and has a width along the X direction that increases linearly away from the first lower segment 202, albeit at different inverse tapering angles. That is, sidewalls of second lower segment 204, the third lower segment 206, the fourth lower segment 208, and the fifth lower segment 210 are not aligned to form a straight line. Instead, the sidewalls undergo step-wise slope change at the interface of two adjacent lower segments. The sixth lower segment 212 is characterized by a taper and its width along the X direction decreases away from the fifth lower segment 210.

Each of the first upper segment 224, the second upper segment 226, the third upper segment 228, and the fourth upper segment 230 extends lengthwise along the Y direction and has a width along the X direction that increases linearly away from the first lower segment 202, albeit at different inverse tapering angles. That is, sidewalls of first upper segment 224, the second upper segment 226, the third upper segment 228, and the fourth upper segment 230 are not aligned to form a straight line. Instead, the sidewalls undergo step-wise slope change at the interface of two adjacent upper segments. The fifth upper segment 232 is characterized by a taper and its width along the X direction decreases linearly away from the fifth lower segment 210. The stage-wise inverse taper of the multi-stage polarization rotator 2001 allows it to rotate signals of a broader spectrum wavelengths, reduce rotational loss, and increase rotation efficiency.

In some embodiments, the lower waveguide layer (including the first lower segment 202, the second lower segment 204, the third lower segment 206, the fourth lower segment 208, the fifth lower segment 210, and the sixth lower segment 212) includes silicon nitride (SiN) or consists essentially of silicon nitride and the upper waveguide layer (includes the first upper segment 224, the second upper segment 226, the third upper segment 228, the fourth upper segment 230, and the fifth upper segment 232) includes silicon (Si) or consists essentially of silicon. In other embodiments, the lower waveguide layer and the upper waveguide layer may be formed of other materials. In one example, both the lower waveguide layer and the upper waveguide layer may include the same material, such as silicon (Si), silicon nitride (SiN), III-V semiconductor material (e.g., gallium nitride (GaN)), or polymers (e.g., poly-imide (PI), polymethyl-methacrylate (PMMA), polystyrene (PS), or polycarbonate (PC)). In another example, the lower waveguide layer includes silicon (Si) and the upper waveguide layer includes silicon nitride (SiN). In yet another example, the lower waveguide layer may include III-V semiconductor and the upper waveguide layer includes polymers or vice versa.

Although not explicitly depicted in the drawings, the multi-stage polarization rotator 2001 may be combined with the first mode converter 1002 shown in FIG. 1 to form a PBSR. To combine, an output of the multi-stage polarization rotator 2001 is coupled to the input of the first mode converter 1002. In some embodiments, it means that the lower waveguide layer of the multi-stage polarization rotator 2001 is continuous with the lower waveguide layer of the first mode converter 1002.

Figures 9, 10, 11, 12:
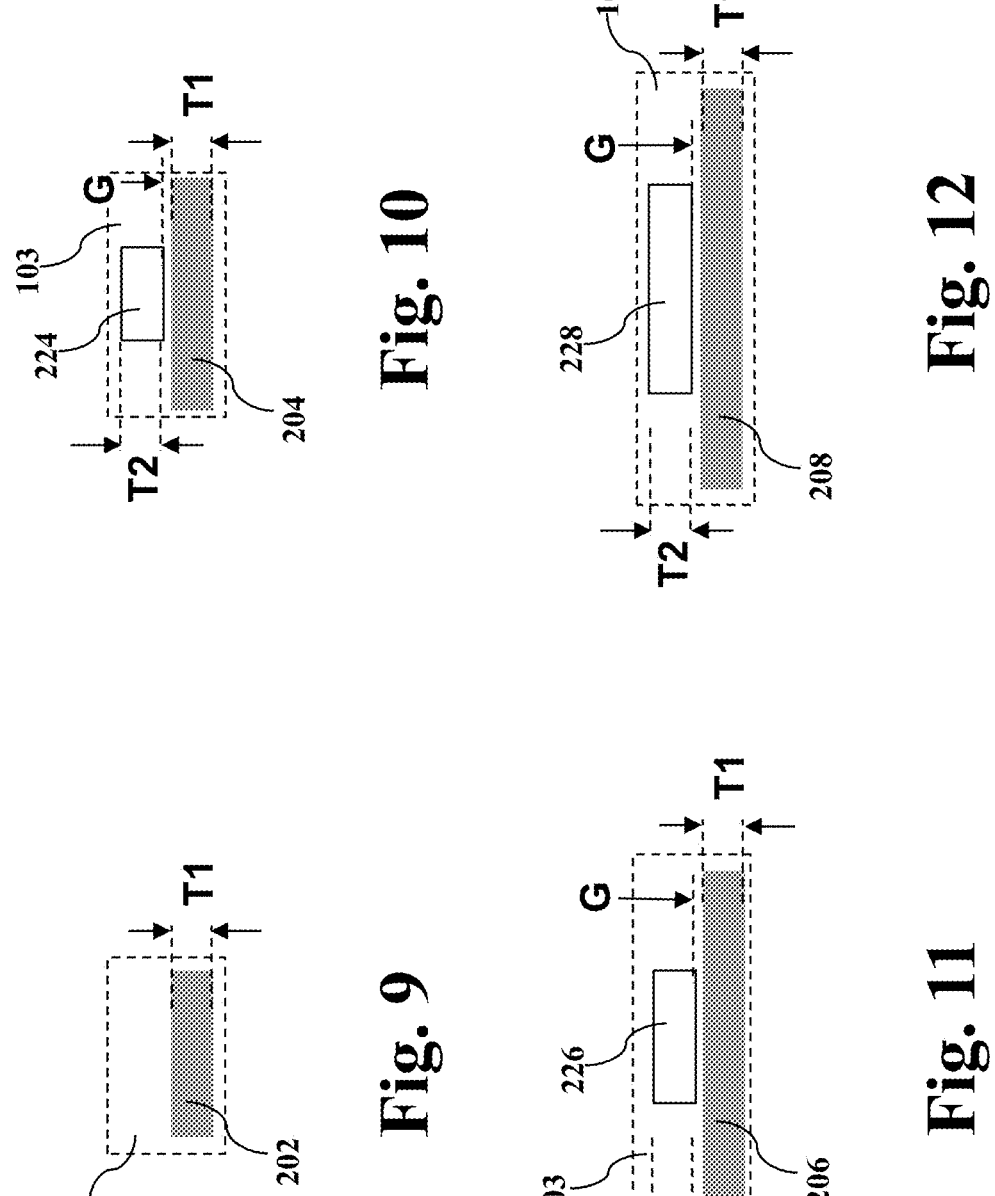
FIGS. 9-12 illustrate various cross-sectional view along a length of the multi-stage polarization rotator in FIG. 8, according to one or more aspects of the present disclosure.

FIGS. 9-12 illustrate various fragmentary cross-sectional views along a length of the multi-stage polarization rotator 2001 in FIG. 8. As shown in FIGS. 9-12, the first lower segment 202, the second lower segment 204, the third lower segment 206, the fourth lower segment 208, the fifth lower segment 210, the sixth lower segment 212, the first upper segment 224, the second upper segment 226, the third upper segment 228, the fourth upper segment 230, and the fifth upper segment 232 are disposed in a dielectric layer 103, which may include silicon oxide. FIG. 9 illustrates a fragmentary cross-sectional view of the first lower segment 202 along line A-A' in FIG. 8. FIG. 10 illustrates a fragmentary cross-sectional view of the second lower segment 204 and the first upper segment 224 along line B-B in FIG. 8. FIG. 11 illustrates a fragmentary cross-sectional view of the third lower segment 206 and the second upper segment 226 along line C-C' in FIG. 8. FIG. 12 illustrates a fragmentary cross-sectional view of the fourth lower segment 208 and the third upper segment 228 along line D-D' in FIG. 8. Along the Z direction, all of the first lower segment 202, the second lower segment 204, the third lower segment 206, the fourth lower segment 208, the fifth lower segment 210, the sixth lower segment 212 has the first thickness T1. Along the Z direction, the first upper segment 224, the second upper segment 226, the third upper segment 228, the fourth upper segment 230, and the fifth upper segment 232 has the second thickness T2. A bottom surface of the upper waveguide layer is spaced apart from a top surface of the bottom waveguide layer by a portion of the dielectric layer 103 at a gap G. According to experimental results and computer simulations, when the lower waveguide layer includes silicon nitride (SiN) and the upper waveguide layer includes silicon (Si), the first thickness T1 should be less than 0.8 μm and the second thickness T2 should be less than 0.4 μm. The gap G should be less than 0.3 μm or the multi-stage polarization rotator 2001 may not function properly.

Figure 13:
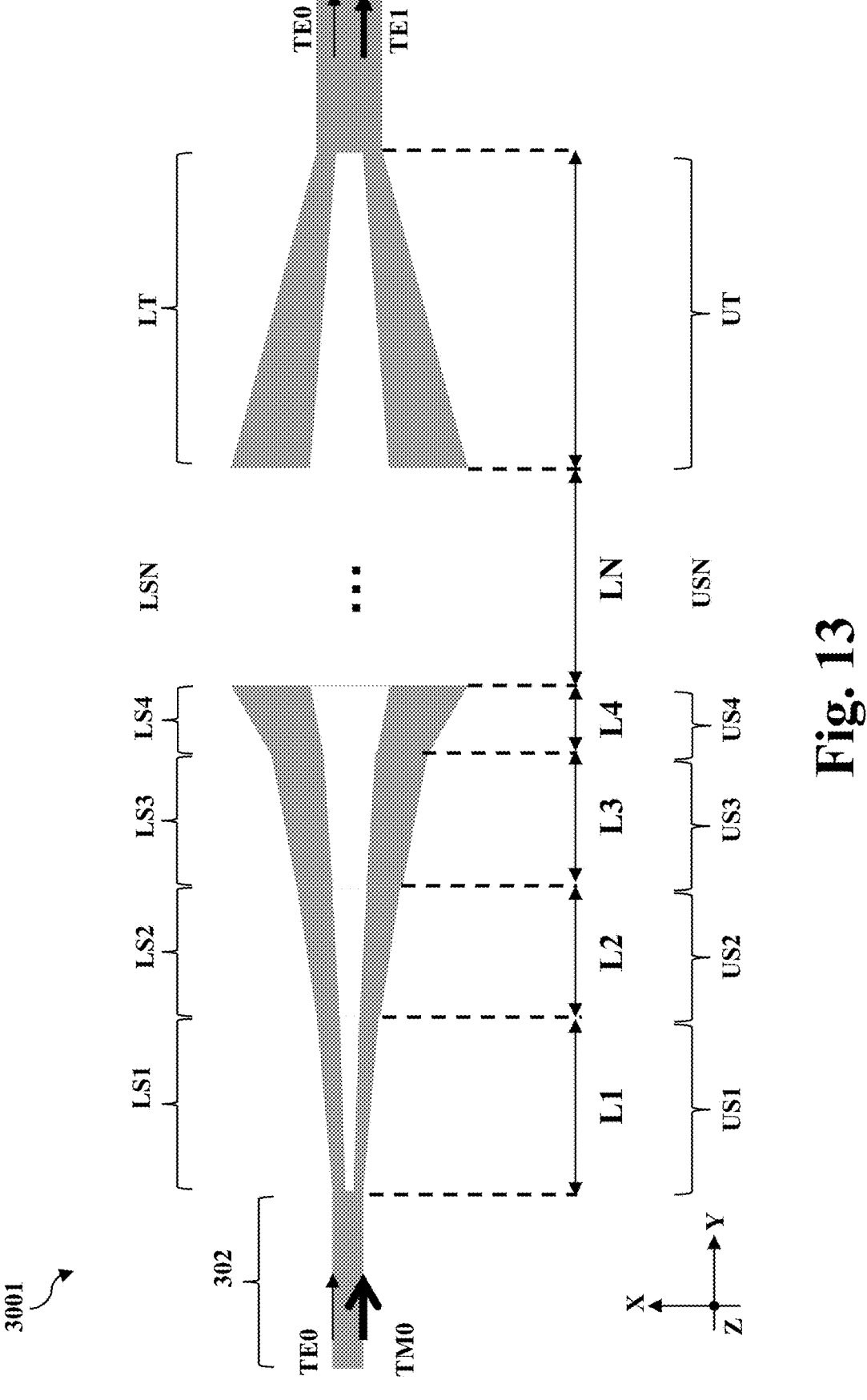
FIG. 13 illustrates an N-stage polarization rotator, according to one or more aspects of the present disclosure.

FIG. 13 illustrates an N-stage polarization rotator 3001. While the multi-stage polarization rotator 2001 in FIG. 8 includes 4 inverse-tapering stages, the present disclosure envisions a generalized N-stage polarization rotator 3001 shown in FIG. 13. As its name suggests, the N-stage polarization rotator 3001 includes N inverse-tapering stages, including lower segments LS1, LS2, LS3, LS4, to LSN and upper segments US1, US2, US3, US4, to USN. In some instances, N is between 5 and 20, such as between 5 and 10. While it is possible to include more inverse-tapering stages, too many stages may translate into an undesirable large or bulking device. Each of the lower segments LS1, LS2, LS3, LS4, to LSN is characterized by a different inverse tapering angle. In some embodiments, the inverse tapering angle of each of the lower segments increases from segment to segment away from the straight segment 302. The same applies to the upper segments. Each of the upper segments US1, US2, US3, US4, to USN is characterized by a different inverse tapering angle. In some embodiments, the inverse tapering angle of each of the upper segments increases from segment to segment away from the straight segment 302. As shown in FIG. 13, each of the upper segments US1, US2, US3, US4, to USN is disposed directly over a corresponding lower segments LS1, LS2, LS3, LS4, to LSN. Additionally, a vertical projection area of each of the upper segments US1, US2, US3, US4, to USN falls completely within a vertical projection area of a corresponding one of the lower segments LS1, LS2, LS3, LS4, to LSN. After the N inverse tapering stages, the lower waveguide layer includes a lower tapering segment LT and the upper waveguide layer includes an upper tapering segment UT. A vertical projection area of the upper tapering segment UT falls completely within a vertical projection area of the lower tapering segment LT.

Although not explicitly depicted in the drawings, the N-stage polarization rotator 3001 may be combined with the first mode converter 1002 shown in FIG. 1 to form a PBSR. To combine, an output of the N-stage polarization rotator 3001 is coupled to the input of the first mode converter 1002. In some embodiments, it means that the lower waveguide layer of the N-stage polarization rotator 3001 is continuous with the lower waveguide layer of the first mode converter 1002.

Figure 14:
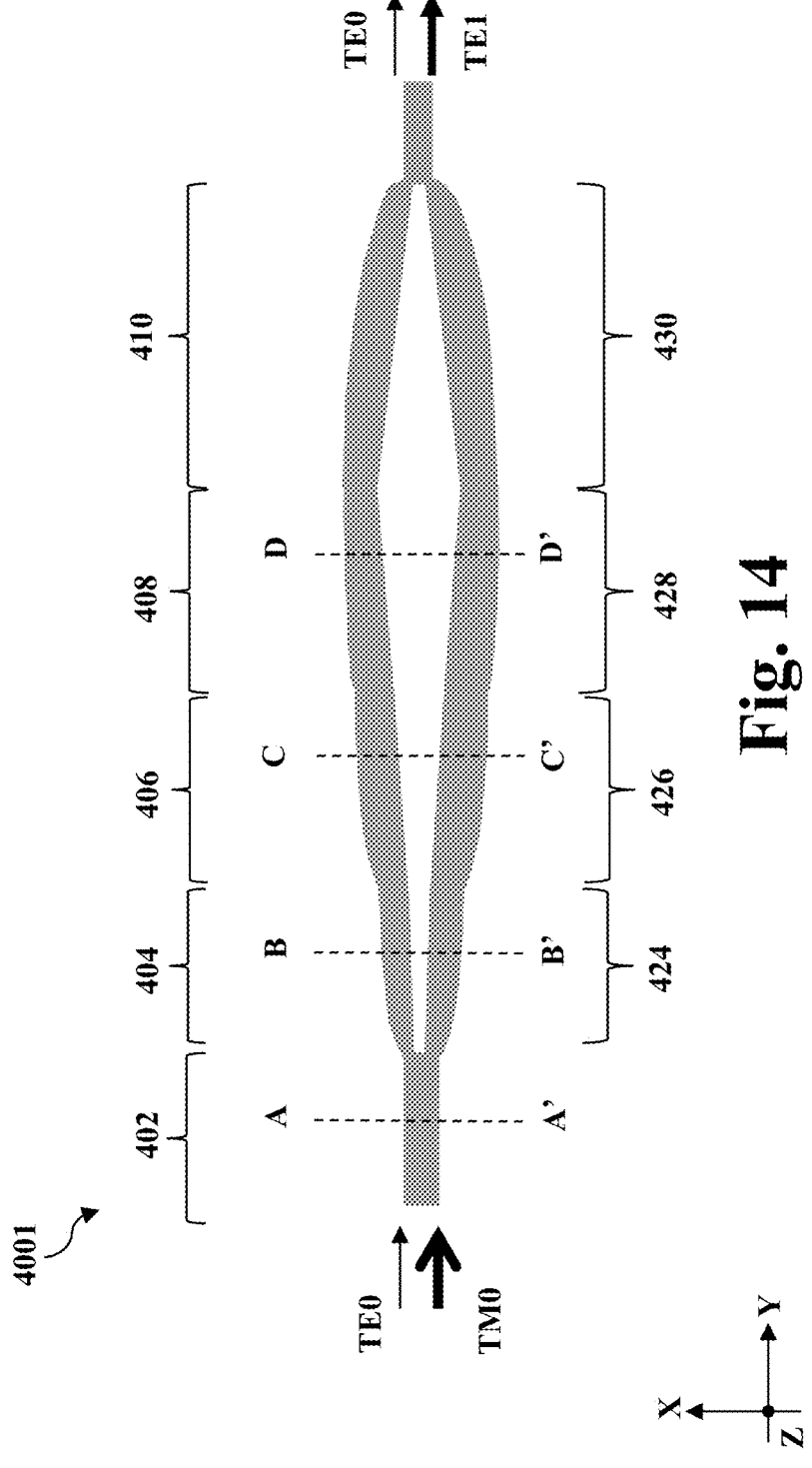
FIG. 14 illustrates a rounded multi-stage polarization rotator, according to one or more aspects of the present disclosure.

FIG. 14 illustrates a rounded multi-stage polarization rotator 4001. Compared to the multi-stage polarization rotator 2001 shown in FIG. 8, the rounded multi-stage polarization rotator 4001 is featured with non-straight or non-linear inverse-tapering or tapering sidewalls. The rounded multi-stage polarization rotator 4001 includes a lower waveguide layer and an upper waveguide layer disposed directly over the lower waveguide layer. The lower waveguide layer of the rounded multi-stage polarization rotator 4001 includes a first lower segment 402, a second lower segment 404, a third lower segment 406, a fourth lower segment 408, and a fifth lower segment 410. The upper waveguide layer of the rounded multi-stage polarization rotator 4001 includes a first upper segment 424, a second upper segment 426, a third upper segment 428, and a fourth upper segment 430. The first lower segment 402, the second lower segment 404, the third lower segment 406, the fourth lower segment 408, and the fifth lower segment 410 are continuous. The first upper segment 424, the second upper segment 426, the third upper segment 428, and the fourth upper segment 430 are continuous.

Reference is still made to FIG. 14. The first lower segment 402 is a straight segment that extends lengthwise along the Y direction and has a uniform width along the X direction. Each of the second lower segment 404, the third lower segment 406, and the fourth lower segment 408 is characterized by a non-linear inverse taper. Each of the second lower segment 404, the third lower segment 406, and the fourth lower segment 408 extends lengthwise along the Y direction and has a width along the X direction that increases polynomially away from the first lower segment 402, albeit at different inverse tapering angles. The sidewalls of the lower waveguide layer undergo step-wise slope change at the interface of two adjacent lower segments. The fifth lower segment 410 is characterized by a taper and its width along the X direction decreases polynomially away from the fourth lower segment 408. Each of the first upper segment 424, the second upper segment 426, and the third upper segment 428 is characterized by a non-linear inverse taper. Each of the first upper segment 424, the second upper segment 426, and the third upper segment 428 extends lengthwise along the Y direction and has a width along the X direction that increases polynomially away from the first lower segment 402, albeit at different inverse tapering angles. The sidewalls of the upper waveguide layer of the rounded multi-stage polarization rotator 4001 undergo step-wise slope change at the interface of two adjacent upper segments. The fourth upper segment 430 is characterized by a taper and its width along the X direction decreases polynomially away from the third upper segment 428. Because inverse-tapering and tapering of the segments in the rounded multi-stage polarization rotator 4001 are modelled by or may be expressed as polynomial functions, all segments have a rounded or curved profile from a top view along the Z direction.

In some embodiments, the lower waveguide layer (including the first lower segment 402, the second lower segment 404, the third lower segment 406, the fourth lower segment 408, and the fifth lower segment 410) includes silicon nitride (SiN) or consists essentially of silicon nitride and the upper waveguide layer (includes the first upper segment 424, the second upper segment 426, the third upper segment 428, and the fourth upper segment 430) includes silicon (Si) or consists essentially of silicon. In other embodiments, the lower waveguide layer and the upper waveguide layer may be formed of other materials. In one example, both the lower waveguide layer and the upper waveguide layer may include the same material, such as silicon (Si), silicon nitride (SiN), III-V semiconductor material (e.g., gallium nitride (GaN)), or polymers (e.g., polyimide (PI), polymethyl-methacrylate (PMMA), polystyrene (PS), or polycarbonate (PC)). In another example, the lower waveguide layer includes silicon (Si) and the upper waveguide layer includes silicon nitride (SiN). In yet another example, the lower waveguide layer may include III-V semiconductor and the upper waveguide layer includes polymers or vice versa.

Although not explicitly depicted in the drawings, the rounded multi-stage polarization rotator 4001 may be combined with the first mode converter 1002 shown in FIG. 1 to form a PBSR. To combine, an output of the rounded multi-stage polarization rotator 4001 is coupled to the input of the first mode converter 1002. In some embodiments, it means that the lower waveguide layer of the rounded multi-stage polarization rotator 4001 is continuous with the lower waveguide layer of the first mode converter 1002.

Figure 15:
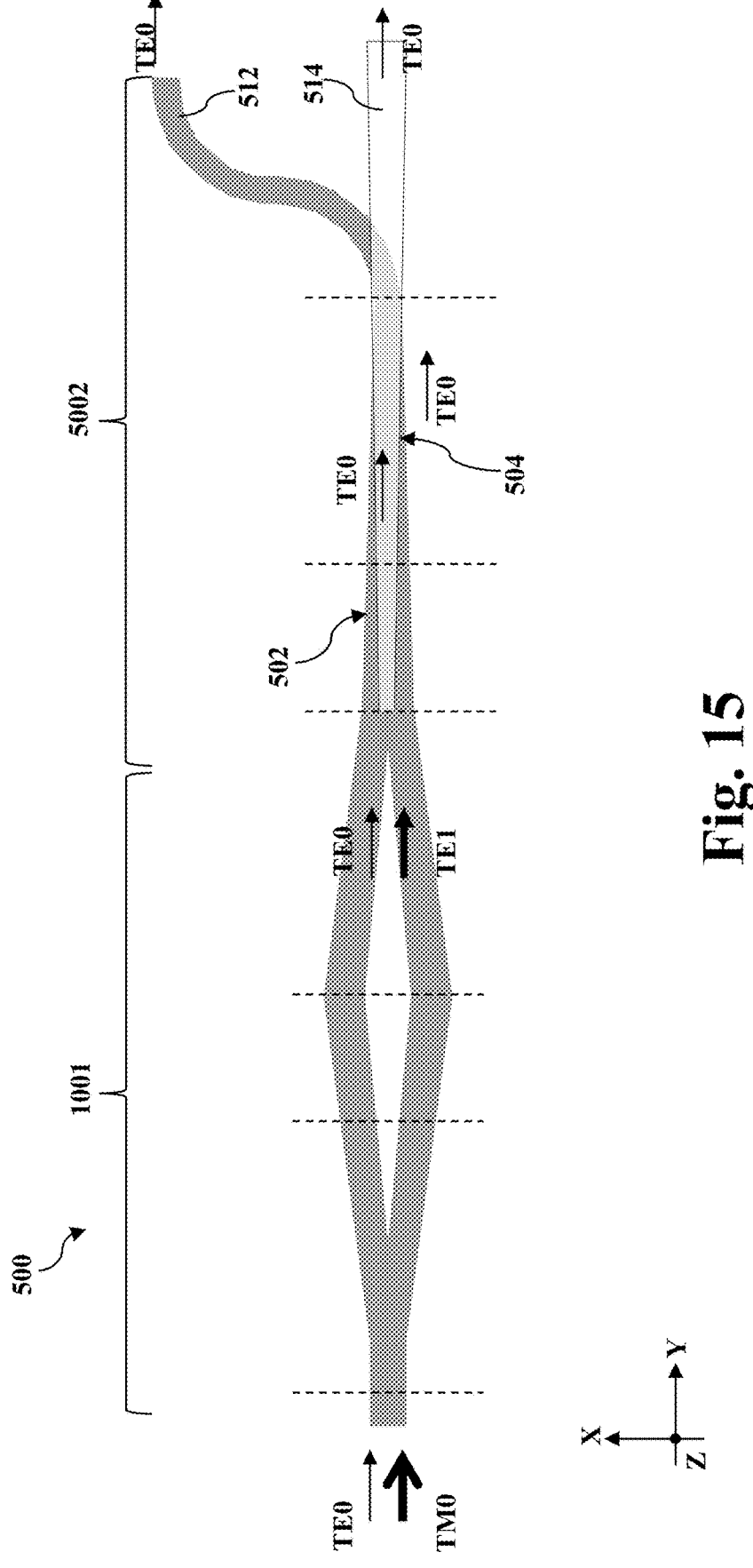
FIG. 15 illustrates a PBSR according to a second embodiment of the present disclosure.

FIG. 15 illustrates a PBSR 500 according to a second embodiment of the present disclosure. The PBSR 500 in FIG. 15 includes the polarization rotator 1001 shown in FIG. 1 and a second mode converter 5002. In other words, an output of the polarization rotator 1001 is coupled to an input of the second mode converter 5002 in the PBSR 500. As details of the polarization rotator 1001 have been described in detail above in conjunction with FIGS. 1-4, description of the polarization rotator 1001 in the PBSR 500 is omitted. The second mode converter 5002 includes a lower waveguide layer and an upper waveguide layer disposed over the lower waveguide layer. In some embodiments illustrated in FIG. 15, the second mode converter 5002 includes a lower tapering member 502 and an upper inverse-tapering member 504 disposed directly over the lower tapering member 502. The lower tapering member 502 extends lengthwise along the Y direction and has a width along the X direction that increases linearly away from the polarization rotator 1001. The upper inverse-tapering member 504 extends lengthwise along the Y direction and has a width along the X direction that increases linearly away from the polarization rotator 1001. The lower tapering member 502 has a bar port 512 and the upper inverse-tapering member 504 has a cross port 514. The shapes (i.e., inverse taper) of the upper inverse-tapering member 504 is configured to convert the TE1 mode signal from the polarization rotator 1001 into TE0 mode signal. As a result, both the bar port 512 and the cross port 514 output signal in the TE0 mode.

In some embodiments, the lower tapering member 502 of the second mode converter 5002 includes silicon nitride (SiN) or consists essentially of silicon nitride and the upper inverse-tapering member 504 of the second mode converter 5002 includes silicon (Si) or consists essentially of silicon. In other embodiments, the lower tapering member 502 and the upper inverse-tapering member 504 may be formed of other materials. In one example, both the lower tapering member 502 and the upper inverse-tapering member 504 may include the same material, such as silicon (Si), silicon nitride (SiN), III-V semiconductor material (e.g., gallium nitride (GaN)), or polymers (e.g., polyimide (PI), polymethyl-methacrylate (PMMA), polystyrene (PS), or polycarbonate (PC)). In another example, the lower tapering member 502 and the upper inverse-tapering member 504 includes silicon nitride (SiN). In yet another example, the lower tapering member 502 includes III-V semiconductor and the upper inverse-tapering member 504 includes polymers or vice versa.

Figure 16:
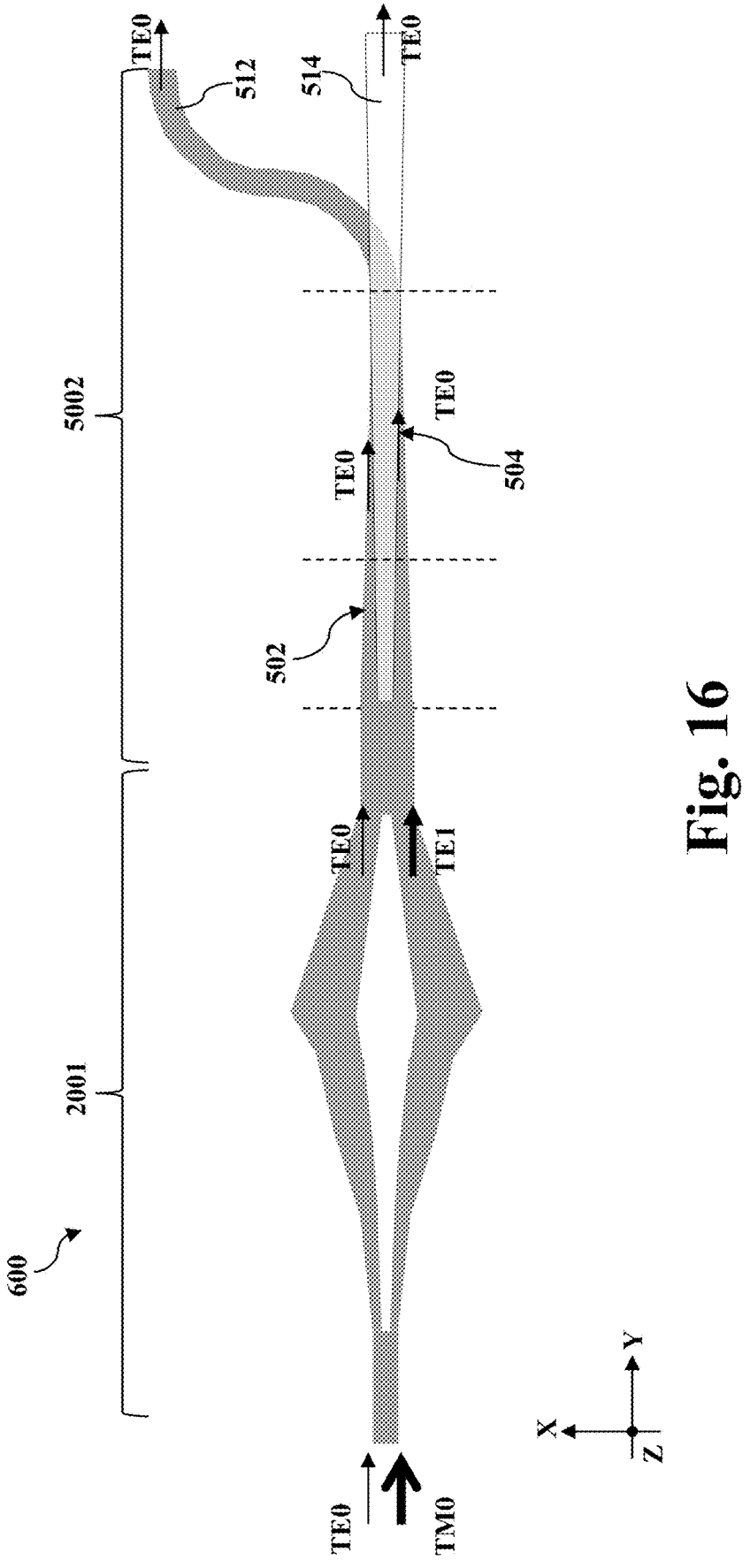
FIG. 16 illustrates a PBSR according to a third embodiment of the present disclosure.

FIG. 16 illustrates a PBSR 600 according to a third embodiment of the present disclosure. It should be understood that the second mode converter 5002 shown in FIG. 15 may also be fitted to the multi-stage polarization rotator 2001 shown in FIG. 8, the N-stage polarization rotator 3001 shown in FIG. 13, or the rounded multi-stage polarization rotator 4001 shown in FIG. 14. For example, the PBSR 600 includes the multi-stage polarization rotator 2001 mated to the second mode converter 5002, where the lower tapering member 502 is continuous with the lower waveguide layer of the multi-stage polarization rotator 2001.

Figure 17:
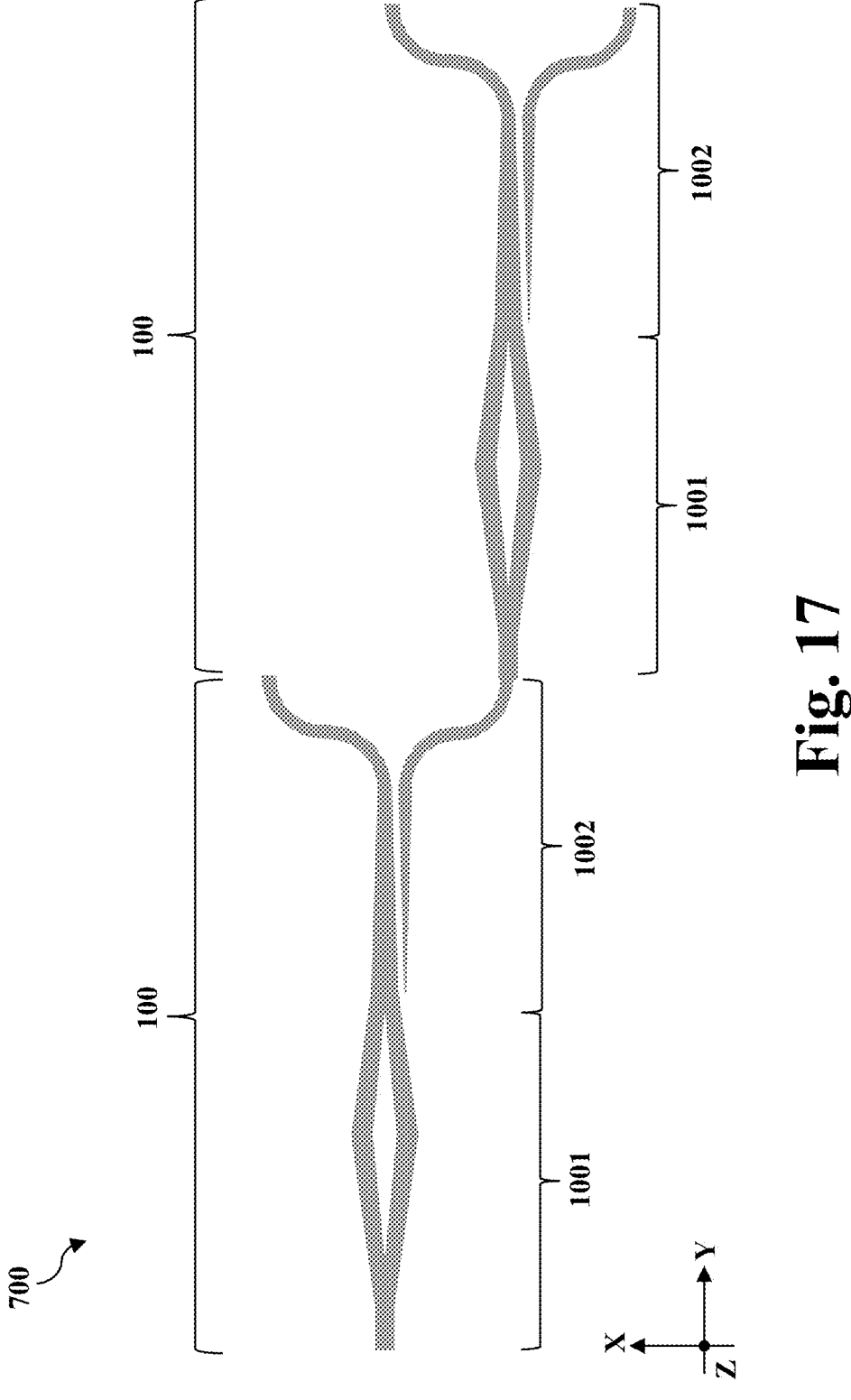
FIG. 17 illustrates a PBSR according to a fourth embodiment of the present disclosure.

FIG. 17 illustrates a PBSR 700 according to a fourth embodiment of the present disclosure. The PBSR 700 includes two PBSR 100 shown in FIG. 1 connected in series to boost conversion efficiency and reduce loss. Rather than forming polarization rotators of several inverse-tapering stages, the PBSR 700 puts a PBSR 100 in series with another PBSR 100. The downstream PBSR 100 functions to convert signals not converted by the upstream PBSR 100.

Figure 18:
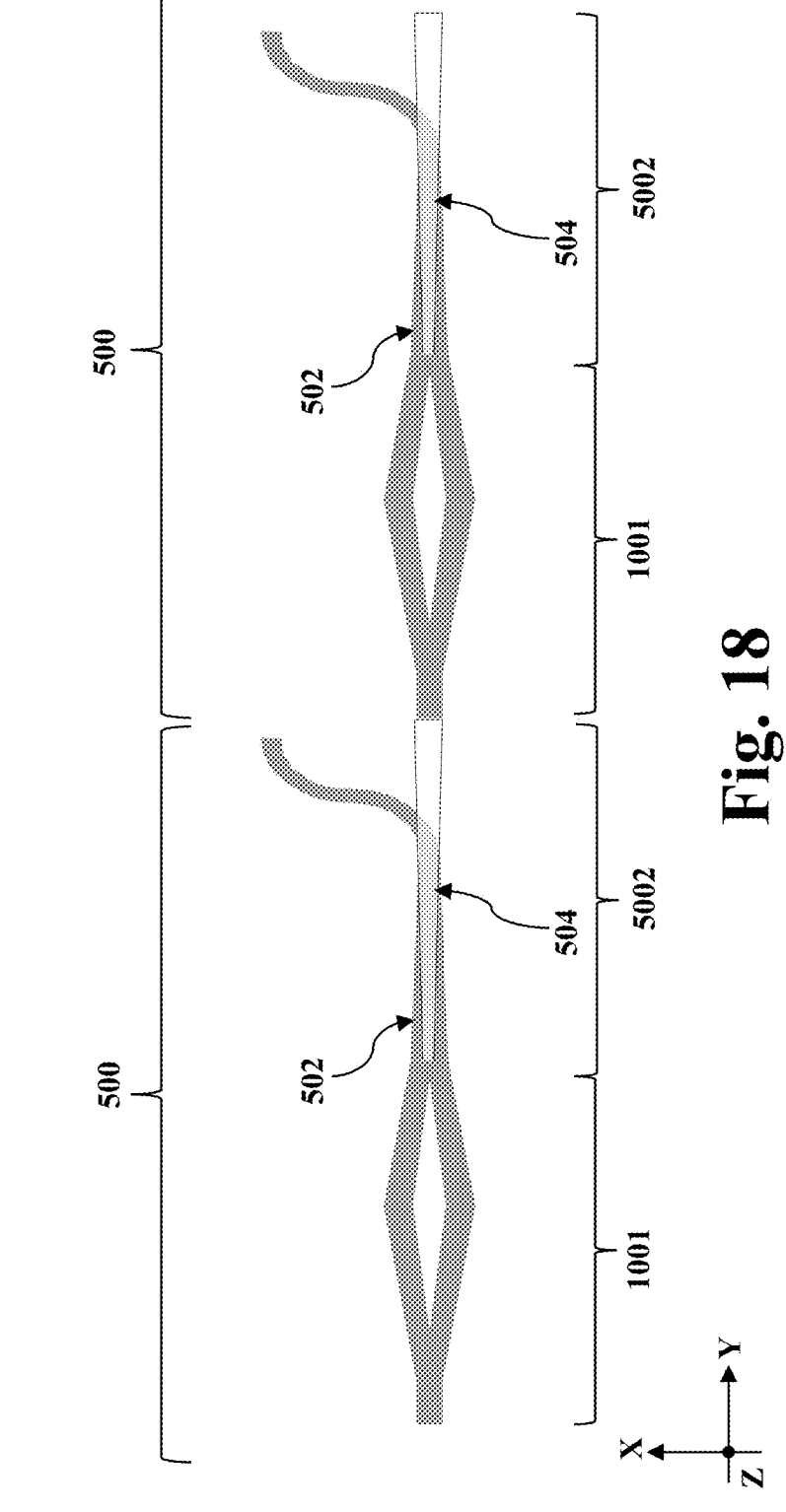
FIG. 18 illustrates a PBSR according to a fifth embodiment of the present disclosure.

FIG. 18 illustrates a PBSR 800 according to a fifth embodiment of the present disclosure. The PBSR 800 includes two PBSR 500 shown in FIG. 15 connected in series to boost conversion efficiency and reduce loss. Rather than forming polarization rotators of several inverse-tapering stages, the PBSR 800 puts a PBSR 500 in series with another PBSR 500. The downstream PBSR 500 functions to convert signals not converted by the upstream PBSR 500.

FIG. 19 illustrates a flowchart of a method 900 for the fabricating the polarization beam splitter rotators 100, 500, 600, 700, and 800, polarization rotator 1001, multi-stage polarization rotator 2001, N-stage polarization rotator 3001, or rounded multi-stage polarization rotator 4001 described above. Method 900 is merely an example and is not intended to limit the present disclosure to what is explicitly illustrated in method 900. Additional steps may be provided before, during and after the method 100, and some steps described can be replaced, eliminated, or moved around for additional embodiments of the method. Not all steps are described herein in detail for reasons of simplicity. Method 900 is described below in conjunction with FIGS. 20-25, which are fragmentary cross-sectional views a workpiece 1100 at different stages of fabrication according to embodiments of method 900.

Figures 20, 21, 22, 23, 24, 25:
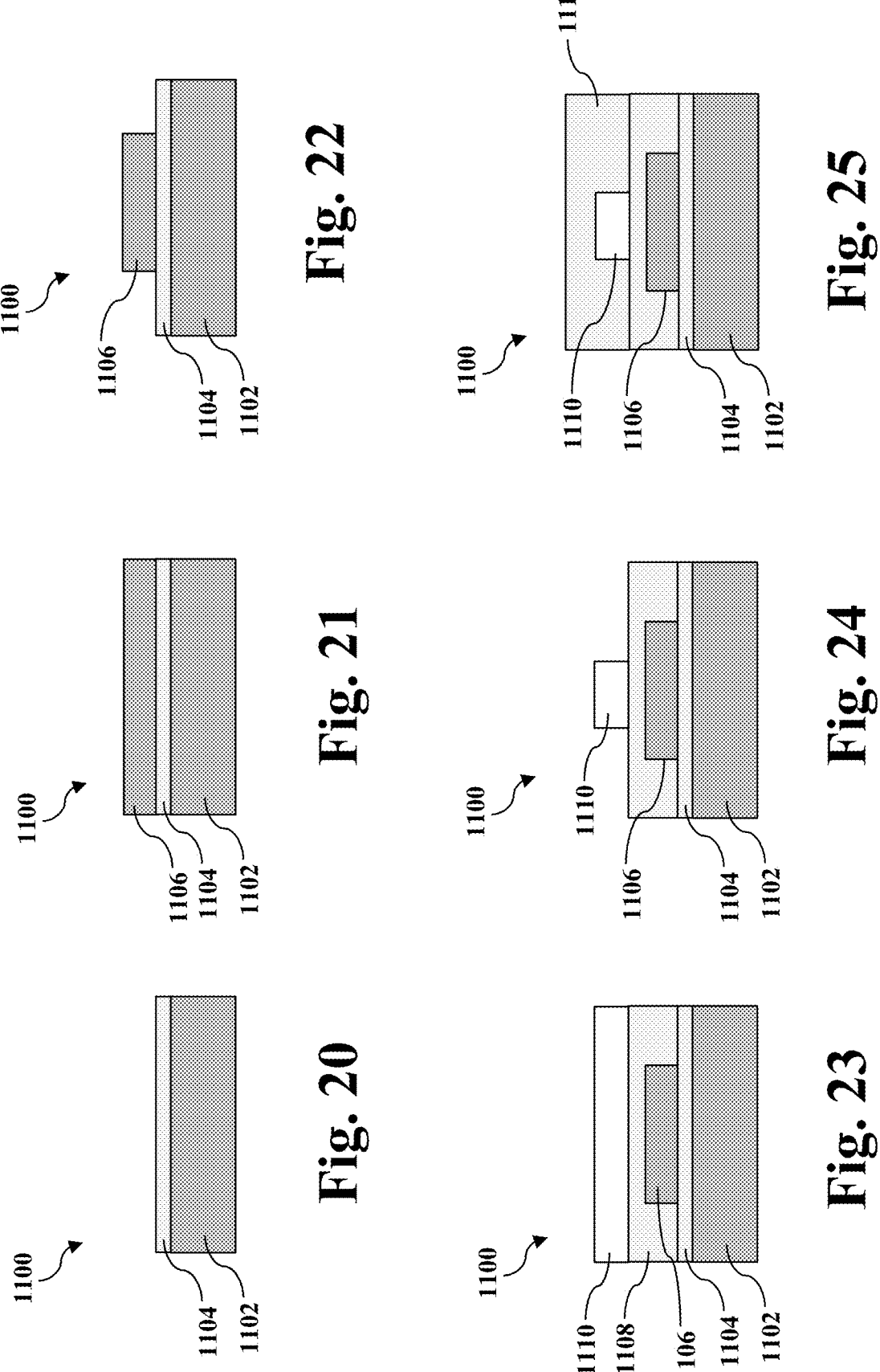
FIGS. 20-25 illustrates fragmentary cross-sectional view of a workpiece 1100 undergoing stages of operations in method 900 in FIG. 19, according to one or more aspects of the present disclosure.

Referring to FIGS. 19 and 20, method 900 includes a block 902 where a first dielectric layer 1104 is deposited over a substrate 1102. In one embodiment, the substrate 1102 may be a silicon (Si) substrate. In some other embodiments, the substrate 1102 may include other semiconductors such as germanium (Ge), silicon germanium (SiGe), or a III-V semiconductor material. Example III-V semiconductor materials may include gallium arsenide (GaAs), indium phosphide (InP), gallium phosphide (GaP), gallium nitride (GaN), gallium arsenide phosphide (GaAsP), aluminum indium arsenide (AlInAs), aluminum gallium arsenide (AlGaAs), gallium indium phosphide (GaInP), and indium gallium arsenide (InGaAs). The substrate 1102 may also include a buried insulating layer, such as a buried silicon oxide layer, to have a silicon-on-insulator (SOI) structure. The first dielectric layer 1104 may include silicon oxide and may be deposited over the substrate 1102 using chemical vapor deposition (CVD), flowable CVD (FCVD), spin-on coating, or a suitable deposition method.

Referring to FIGS. 19 and 21, method 900 includes a block 904 where a lower waveguide layer 1106 is deposited over the first dielectric layer 1104. In some embodiments, the lower waveguide layer 1106 may include silicon nitride, silicon, or III-V semiconductor material (e.g., GaN). The lower waveguide layer 1106 may be deposited using CVD.

Referring to FIGS. 19 and 22, method 900 includes a block 906 where the lower waveguide layer 1106 is patterned. The patterning at block 906 may include photolithography and etching processes. In an example process, at least one hard mask layer is deposited over the lower waveguide layer 1106. The at least one hard mask layer may include silicon oxide, silicon nitride, or a combination thereof. A photoresist layer is deposited over the at least one hard mask layer. After going through soft baking, mask aligning, exposure, post-exposure baking, developing, rinsing, drying (e.g., spin-drying and/or hard baking), the photoresist layer is patterned. The patterned photoresist layer is then applied as an etch mask to etch the at least one hard mask layer using a dry etching process (e.g., RIE etching). The patterned hard mask layer is then used as an etch mask to etch the lower waveguide layer 1106 to form patterns shown in FIGS. 1-18.

Referring to FIGS. 19 and 23, method 900 includes a block 908 where a second dielectric layer 1108 is deposited over the patterned lower waveguide layer 1106. In some embodiments, the second dielectric layer 1108 may have the same composition with the first dielectric layer 1104. That is, the second dielectric layer 1108 may include silicon oxide and may be deposited using CVD, FCVD, spin-on coating, or a suitable method.

Referring to FIGS. 19 and 23, method 900 includes a block 910 where an upper waveguide layer 1110 is deposited over the second dielectric layer 1108. In some embodiments, the upper waveguide layer 1110 may include silicon, silicon nitride, or polymer (e.g., polyimide (PI), polymethyl-methacrylate (PMMA), polystyrene (PS), or polycarbonate (PC)). When the upper waveguide layer 1110 includes silicon or silicon nitride, it may be deposited using CVD. When the upper waveguide layer 1110 includes polymer, it may be deposited using FCVD or spin-on coating.

Referring to FIGS. 19 and 24, method 900 includes a block 912 where the upper waveguide layer 1110 is patterned. The patterning at block 912 may include photolithography and etching processes. In an example process, at least one hard mask layer is deposited over the upper waveguide layer 1110. The at least one hard mask layer may include silicon oxide, silicon nitride, or a combination thereof. A photoresist layer is deposited over the at least one hard mask layer. After going through soft baking, mask aligning, exposure, post-exposure baking, developing, rinsing, drying (e.g., spin-drying and/or hard baking), the photoresist layer is patterned. The patterned photoresist layer is then applied as an etch mask to etch the at least one hard mask layer using a dry etching process (e.g., RIE etching). The patterned hard mask layer is then used as an etch mask to etch the upper waveguide layer 1110 to form patterns shown in FIGS. 1-18.

Referring to FIGS. 19 and 25, method 900 includes a block 914 where a third dielectric layer 1112 is deposited over the patterned upper waveguide layer 1110. In some embodiments, the third dielectric layer 1112 may have the same composition with the first dielectric layer 1104. That is, the third dielectric layer 1112 may include silicon oxide and may be deposited using CVD, FCVD, spin-on coating, or a suitable method.

In one exemplary aspect, the present disclosure is directed to an optical device. The optical device includes a polarization rotator that includes a straight waveguide segment having a constant width along a direction between a first end and a second end, a first widening waveguide segment continuing from the second end of the straight waveguide segment, the first widening waveguide segment having a first width along the direction, the first width increasing linearly away from the second end, a first tapering waveguide segment continuing from the first widening waveguide segment, the first tapering waveguide segment having a second width along the direction, the second width decreasing linearly away from the first widening waveguide segment, a second widening waveguide segment disposed over the first widening waveguide segment, and a second tapering waveguide segment continuing from the second widening waveguide segment. The optical device further includes a mode converter that includes a third tapering waveguide segment continuing from the first tapering waveguide segment, and a third widening waveguide segment disposed over the third tapering waveguide segment. An output end of the polarization rotator is coupled to an input end of the mode converter.

In some embodiments, a vertical projection area of the second widening waveguide segment falls completely within a vertical projection area of the first widening waveguide segment and a vertical projection area of the second tapering waveguide segment falls completely within a vertical projection area of the first tapering waveguide segment. In some implementations, the straight waveguide segment, the first widening waveguide segment, the first tapering waveguide segment, the second widening waveguide segment, the second tapering waveguide segment, the third tapering waveguide segment, and the third widening waveguide segment consist essentially of silicon. In some embodiments, the straight waveguide segment, the first widening waveguide segment, the first tapering waveguide segment, the second widening waveguide segment, the second tapering waveguide segment, the third tapering waveguide segment, and the third widening waveguide segment consist essentially of silicon nitride. In some implementations, the straight waveguide segment, the first widening waveguide segment, the first tapering waveguide segment, the second widening waveguide segment, the second tapering waveguide segment, the third tapering waveguide segment, and the third widening waveguide segment include a III-V semiconductor material. In some instances, the straight waveguide segment, the first widening waveguide segment, the first tapering waveguide segment, the second widening waveguide segment, the second tapering waveguide segment, the third tapering waveguide segment, and the third widening waveguide segment include a polymeric material. In some embodiments, the straight waveguide segment, the first widening waveguide segment, the first tapering waveguide segment, and the third tapering waveguide segment consist essentially of silicon and the second widening waveguide segment, the second tapering waveguide segment, and the third widening waveguide segment consist essentially of silicon nitride. In some instances, the straight waveguide segment, the first widening waveguide segment, the first tapering waveguide segment, the second widening waveguide segment, the second tapering waveguide segment, the third tapering waveguide segment, and the third widening waveguide segment are disposed in a silicon oxide layer. In some embodiments, top surfaces of the first widening waveguide segment, the first tapering waveguide segment, and the third tapering waveguide segment are spaced apart from bottom surfaces of the second widening waveguide, the second tapering waveguide segment, and the third widening waveguide segment, respectively, by a portion of the silicon oxide layer.

In another exemplary aspect, the present disclosure is directed to a polarization rotator. The polarization rotator includes a straight waveguide segment having a constant width along a direction between a first end and a second end, at least two bottom inverse-tapering waveguide segments continuing sequentially from the second end of the straight waveguide segment, a bottom tapering waveguide segment continuing from the at least two bottom inverse-tapering waveguide segments, at least two top inverse-tapering waveguide segments disposed over the at least two bottom inverse-tapering waveguide segments, and a top tapering waveguide segment continuing from the at least two top inverse-tapering waveguide segments and disposed directly over the bottom tapering waveguide segment. The straight waveguide segment, the at least two bottom inverse-tapering waveguide segments, the bottom tapering waveguide segment, the at least two top inverse-tapering waveguide segments, and the top tapering waveguide segment are disposed in a silicon oxide layer.

In some embodiments, the straight waveguide segment, the at least two bottom inverse-tapering waveguide segments, the bottom tapering waveguide segment consist essentially of silicon and the at least two top inverse-tapering waveguide segments and the top tapering waveguide segment consist essentially of silicon nitride. In some implementations, the straight waveguide segment, the at least two bottom inverse-tapering waveguide segments, the bottom tapering waveguide segment include a first thickness and the at least two top inverse-tapering waveguide segments and the top tapering waveguide segment include a second thickness smaller than the first thickness. In some embodiments, the first thickness is between about 0.4 μm and about 0.8 μm and the second thickness is between about 0.2 μm and about 0.4 μm. In some embodiments, the straight waveguide segment extends lengthwise along a first direction and has a width along a second direction perpendicular to the first direction and a ratio of the width to the first thickness is between about 1.25 and about 2. In some embodiments, the at least two bottom inverse-tapering waveguide segments include a first length along the first direction, the bottom tapering waveguide segment includes a second length along the first direction and the first length is greater than the second length. In some embodiments, top surfaces of the at least two bottom inverse-tapering waveguide segments are spaced apart from bottom surfaces of the at least two top inverse-tapering waveguide segments by a gap. T top surface of the bottom tapering waveguide segment is spaced apart from a bottom surface of the top tapering waveguide segment by the gap and the gap is between about 0.4 μm and about 3 μm.

In yet another exemplary aspect, the present disclosure is directed to a method. The method includes depositing a first dielectric layer over a substrate, depositing a lower waveguide layer over the first dielectric layer, patterning the lower waveguide layer to form a straight waveguide segment having a constant width along a direction, a first widening waveguide segment continuing from the straight waveguide segment, a first tapering waveguide segment continuing from the first widening waveguide segment, and a second tapering waveguide segment continuing from the first tapering waveguide segment, depositing a second dielectric layer over the patterned lower waveguide layer, depositing an upper waveguide layer over the second dielectric layer, patterning the upper waveguide layer to form a second widening waveguide segment disposed over the first widening waveguide segment, a third tapering waveguide segment continuing from the second widening waveguide segment, and a third widening waveguide segment disposed over the second tapering waveguide segment, and depositing a third dielectric layer over the patterned upper waveguide layer.

In some embodiments, the lower waveguide layer includes silicon nitride. In some implementations, the upper waveguide layer includes silicon. In some instances, the first dielectric layer, the second dielectric layer and the third dielectric layer include silicon oxide.

The foregoing outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. An optical device, comprising:
a polarization rotator comprising:
   a straight waveguide segment having a constant width along a direction between a first end and a second end,
   a first widening waveguide segment continuing from the second end of the straight waveguide segment, the first widening waveguide segment having a first width along the direction, the first width increasing linearly away from the second end,
   a first tapering waveguide segment continuing from the first widening waveguide segment, the first tapering waveguide segment having a second width along the direction, the second width decreasing linearly away from the first widening waveguide segment,
   a second widening waveguide segment disposed over the first widening waveguide segment, and
   a second tapering waveguide segment continuing from the second widening waveguide segment; and
a mode converter comprising:
   a third tapering waveguide segment continuing from the first tapering waveguide segment, and
   a third widening waveguide segment disposed over the third tapering waveguide segment,
wherein an output end of the polarization rotator is coupled to an input end of the mode converter.

2. The optical device of claim 1,
wherein a vertical projection area of the second widening waveguide segment falls completely within a vertical projection area of the first widening waveguide segment,
wherein a vertical projection area of the second tapering waveguide segment falls completely within a vertical projection area of the first tapering waveguide segment.

3. The optical device of claim 1,
wherein the straight waveguide segment, the first widening waveguide segment, the first tapering waveguide segment, the second widening waveguide segment, the second tapering waveguide segment, the third tapering waveguide segment, and the third widening waveguide segment consist essentially of silicon.

4. The optical device of claim 1,
wherein the straight waveguide segment, the first widening waveguide segment, the first tapering waveguide segment, the second widening waveguide segment, the second tapering waveguide segment, the third tapering waveguide segment, and the third widening waveguide segment consist essentially of silicon nitride.

5. The optical device of claim 1,
wherein the straight waveguide segment, the first widening waveguide segment, the first tapering waveguide segment, the second widening waveguide segment, the second tapering waveguide segment, the third tapering waveguide segment, and the third widening waveguide segment comprise a III-V semiconductor material.

6. The optical device of claim 1,
wherein the straight waveguide segment, the first widening waveguide segment, the first tapering waveguide segment, the second widening waveguide segment, the second tapering waveguide segment, the third tapering waveguide segment, and the third widening waveguide segment comprise a polymeric material.

7. The optical device of claim 1,
wherein the straight waveguide segment, the first widening waveguide segment, the first tapering waveguide segment, and the third tapering waveguide segment consist essentially of silicon,
wherein the second widening waveguide segment, the second tapering waveguide segment, and the third widening waveguide segment consist essentially of silicon nitride.

8. The optical device of claim 1, wherein the straight waveguide segment, the first widening waveguide segment, the first tapering waveguide segment, the second widening waveguide segment, the second tapering waveguide segment, the third tapering waveguide segment, and the third widening waveguide segment are disposed in a silicon oxide layer.

9. The optical device of claim 8, wherein top surfaces of the first widening waveguide segment, the first tapering waveguide segment, and the third tapering waveguide segment are spaced apart from bottom surfaces of the second widening waveguide segment, the second tapering waveguide segment, and the third widening waveguide segment, respectively, by a portion of the silicon oxide layer.

10. An optical device, comprising:
a polarization rotator comprising:
   a straight waveguide segment having a constant width along a direction between a first end and a second end;
   at least two bottom inverse-tapering waveguide segments continuing sequentially from the second end of the straight waveguide segment;
   a bottom tapering waveguide segment continuing from the at least two bottom inverse-tapering waveguide segments;
   at least two top inverse-tapering waveguide segments disposed over the at least two bottom inverse-tapering waveguide segments; and
   a top tapering waveguide segment continuing from the at least two top inverse-tapering waveguide segments and disposed directly over the bottom tapering waveguide segment and
a mode converter comprising:
   a lower tapering waveguide segment continuing from the bottom tapering waveguide segment, and
   an upper widening waveguide segment disposed over the lower tapering waveguide segment,
wherein an output end of the polarization rotator interfaces an input end of the mode converter.

11. The optical device of claim 10,
wherein a vertical projection area of the at least two top inverse-tapering waveguide segments falls completely within a vertical projection area of the at least two bottom inverse-tapering waveguide segments,
wherein a vertical projection area of the top tapering waveguide segment falls completely within a vertical projection area of the bottom tapering waveguide segment.

12. The optical device of claim 10, wherein the straight waveguide segment, the at least two bottom inverse-tapering waveguide segments, the bottom tapering waveguide segment, the at least two top inverse-tapering waveguide segments, the top tapering waveguide segment, the lower tapering waveguide segment, and the upper widening waveguide segment comprise silicon, silicon nitride, a III-V semiconductor material, or a polymeric material.

13. The optical device of claim 10,
wherein the straight waveguide segment, the at least two bottom inverse-tapering waveguide segments, the bottom tapering waveguide segment, and the lower tapering waveguide segment consist essentially of silicon nitride, wherein the at least two top inverse-tapering waveguide segments, the top tapering waveguide segment, and the upper widening waveguide segment consist essentially of silicon.

14. The optical device of claim 10, wherein the straight waveguide segment, the at least two bottom inverse-tapering waveguide segments, the bottom tapering waveguide segment, and the lower tapering waveguide segment comprise a first thickness, wherein the at least two top inverse-tapering waveguide segments, the top tapering waveguide segment, and the upper widening waveguide segment comprise a second thickness, wherein the first thickness is smaller than 0.8 µm, wherein the second thickness is smaller than 0.4 µm.

15. The optical device of claim 10, wherein the at least two top inverse-tapering waveguide segments is vertically spaced apart from the at least two top inverse-tapering waveguide segments by a dielectric layer for a distance, wherein the distance is smaller than 0.3 µm.

16. The optical device of claim 15, wherein the dielectric layer comprises silicon oxide.

17. An optical device, comprising:

a straight waveguide segment having a constant width along a direction between a first end and a second end;

a first widening waveguide segment continuing from the second end of the straight waveguide segment, the first widening waveguide segment having a first width along the direction, the first width increasing linearly away from the second end;

a first tapering waveguide segment continuing from the first widening waveguide segment, the first tapering waveguide segment having a second width along the direction, the second width decreasing linearly away from the first widening waveguide segment;

a second widening waveguide segment disposed over the first widening waveguide segment;

a second tapering waveguide segment continuing from the second widening waveguide segment;

a third tapering waveguide segment continuing from the first tapering waveguide segment; and a third widening waveguide segment disposed over the third tapering waveguide segment.

18. The optical device of claim 17, wherein a vertical projection area of the second widening waveguide segment falls completely within a vertical projection area of the first widening waveguide segment, wherein a vertical projection area of the second tapering waveguide segment falls completely within a vertical projection area of the first tapering waveguide segment.

19. The optical device of claim 17, wherein the straight waveguide segment, the first widening waveguide segment, the first tapering waveguide segment, the second widening waveguide segment, the second tapering waveguide segment, the third tapering waveguide segment, and the third widening waveguide segment comprise silicon, silicon nitride, a III-V semiconductor material, or a polymeric material.

20. The optical device of claim 17, wherein the straight waveguide segment, the first widening waveguide segment, the first tapering waveguide segment, and the third tapering waveguide segment consist essentially of silicon, wherein the second widening waveguide segment, the second tapering waveguide segment, and the third widening waveguide segment consist essentially of silicon nitride.

* * * * *